United States Patent
Chyou et al.

(10) Patent No.: US 9,895,647 B2
(45) Date of Patent: Feb. 20, 2018

(54) METHOD FOR CONTROLLING CIRCULATION RATE OF SOLIDS IN AN INTERCONNECTED FLUIDIZED BED

(71) Applicant: INSTITUTE OF NUCLEAR ENERGY RESEARCH, ATOMIC ENERGY COUNCIL, EXEC. YUAN, R.O.C., Taoyuan County (TW)

(72) Inventors: Yau-Pin Chyou, Taoyuan County (TW); Po-Chuang Chen, Taoyuan County (TW); Hung-Te Hsu, Taoyuan County (TW); Keng-Tung Wu, Taichung (TW)

(73) Assignee: Institute of Nuclear Energy Research, Atomic Energy Council, Executive Yuan, R.O.C., Taoyuan County (TW)

( * ) Notice: Subject to any disclaimer, the term of this patent is extended or adjusted under 35 U.S.C. 154(b) by 192 days.

(21) Appl. No.: 14/731,598

(22) Filed: Jun. 5, 2015

(65) Prior Publication Data
US 2016/0166973 A1    Jun. 16, 2016

(30) Foreign Application Priority Data

Dec. 12, 2014    (TW) .............................. 103143401 A

(51) Int. Cl.
*B01D 53/12* (2006.01)
*B01D 53/34* (2006.01)
*B01D 53/62* (2006.01)
*B01D 53/83* (2006.01)
*B01J 8/34* (2006.01)
*B01J 8/36* (2006.01)

(52) U.S. Cl.
CPC ........... *B01D 53/12* (2013.01); *B01D 53/346* (2013.01); *B01D 53/62* (2013.01); *B01D 53/83* (2013.01); *B01J 8/34* (2013.01); *B01J 8/36* (2013.01); *B01D 2257/504* (2013.01); *B01D 2258/0283* (2013.01); *Y02C 10/04* (2013.01)

(58) Field of Classification Search
CPC .......................... B01D 53/12; B01D 2257/504
USPC .............................. 431/7; 110/245, 345, 216
See application file for complete search history.

(56) References Cited

U.S. PATENT DOCUMENTS

| | | | | |
|---|---|---|---|---|
| 3,368,871 A | * | 2/1968 | O'Connor | ................. B01J 8/24 106/253 |
| 5,743,197 A | * | 4/1998 | Kinni | ..................... F23C 10/20 110/245 |
| 2010/0242815 A1 | * | 9/2010 | Chiu | ..................... B01J 8/0025 110/345 |
| 2014/0102342 A1 | * | 4/2014 | Maryamchik | ....... F22B 31/0038 110/245 |

* cited by examiner

*Primary Examiner* — Gregory Huson
*Assistant Examiner* — Nikhl Mashruwala
(74) *Attorney, Agent, or Firm* — Rosenberg, Klein & Lee

(57) ABSTRACT

The present invention provides a method for dynamically controlling the circulation rate of solids in an interconnected fluidized bed. When an interconnected fluidized bed is operating, it is available to control the circulation rate of solids by adopting the steps of adjusting the height difference between the orifice on the weir and the bottom surface of the bed region, adjusting the cross-sectional area of the above orifice, or adjusting the height of the above weir. By using multiple ways, the circulation rate of solids can be improved substantially. In addition, the curve of circulation rate of solids can be converged to the maximum circulation rate of solids effectively.

8 Claims, 7 Drawing Sheets

METHOD FOR CONTROLLING CIRCULATION RATE OF SOLIDS IN AN INTERCONNECTED FLUIDIZED BED

FIELD OF THE INVENTION

The present invention relates to a control method, and particularly to a method for controlling the circulation rate of solids in an interconnected fluidized bed dynamically.

BACKGROUND OF THE INVENTION

A large amount emission of carbon dioxide caused by massive fossil fuel-fired power generation has been an environmental issue for the globe warming. Before an efficient solution of the requirement for fossil fuel is provided, carbon dioxide capture and storage (CCS) technology is an important method known up to date for reducing carbon dioxide emission. Such method is also certified by the Intergovernmental Panel on Climate Change (IPCC) as an efficient mechanism for reducing the greenhouse gases.

According to the methods for converting fuel to heat and electricity, current carbon dioxide capture techniques can be grouped into three categories: i.e., post-combustion capture, pre-combustion capture, and oxy-combustion capture (oxy-fuel). Chemical-looping combustion process is classified as a special case of oxy-combustion, and it is particularly promising to execute the process by using interconnected fluidized beds. This process exhibits the features that include low emissions and high efficiency, making it recognized as full of potential for development.

The principle of chemical looping is to feed fuel into a fuel reactor for proceeding reduction reaction with the added oxygen carrier $Me_xO_y$ at 900-950° C. The fuel is thus oxidized to $CO_2$ and $H_2O$, while $Me_xO_y$ is reduced to $Me_xO_{y-1}$. The reduced $Me_xO_{y-1}$ is then sent into an air reactor for proceeding oxidation reaction with oxygen at 500-700° C. and converted back to $Me_xO_y$; hence, a looping process is formed. Accordingly, as the oxygen carrier is circulating in the chemical looping process, carbon dioxide and steam vapor are produced in the fuel reactor. By separating the vapor through a cooling unit, it can acquire carbon dioxide with purity higher than 95%. Besides, heat is also acquired in the air reactor. The produced carbon dioxide can be reused or sequestrated directly. This method has the advantages of low cost and high efficiency.

The interconnected fluidized bed integrates a plurality of circulating fluidized bed and several solid transport pipes, in which the various reaction processes are accomplished by transporting solids among multiple fluidized beds at different fluidized speeds; for the sake of implementation, the beds are formed by combining at least two single beds. In the process of operation, the fluidized solids descend in a dense bed, pass through orifices at the bottom, and enter a lean bed. Then said solids ascend in the lean bed, surmount a weir at the top, enter another dense bed, and the cycle repeats. The interconnected fluidized bed has the advantages similar to a single circulating fluidized bed, but without complicated mechanical structures such as the solid transport pipes; thus, the solid circulation rate is high and the solid loss is less. Consequently, the interconnected fluidized bed reduces the costs in installation and operation, and its operation efficiency is higher than that of various traditional fluidized beds.

Although the interconnected fluidized bed saves massive transport pipes in the structure, there is currently lack of efficient technique for dynamically controlling the circulation rate of inner solid (fluid-like particles). Because the reaction rate in respective bed regions is only relied on and limited by the predetermined system standard, after the solids enter the interconnected fluidized bed, a user can at most alter the total feed amount of solids and the gas velocity. This limitation does not meet the requirements of industry, especially when linear adjustment on the circulation rate of solids cannot be performed effectively for finding the optimum circulation rate. Furthermore, with the conditions limited by altering the total amount of solids and the gas velocity, the functions of the interconnected fluidized bed cannot be utilized completely.

SUMMARY

An objective of the present invention is to provide a method for dynamically controlling an interconnected fluidized bed, which can achieve the efficacy of increasing rate not achievable by altering only one single parameter by adjusting a plurality of parameters related to the circulation rate of solids (CRS) in an interconnected fluidized bed.

Another objective of the present invention is to provide a method for dynamically controlling an interconnected fluidized bed, which can adjust the real-time circulation rate of solids for meeting the requirement of changing loads.

Still, another objective of the present invention is to provide a method for dynamically controlling an interconnected fluidized bed, which can adjust the circulation rate of solids to an appropriate one, according to the property of solids. This prevents retention time of solids in a single bed region excessively short, due to fast circulation rate, and thus reducing the possibility of solid exit before completion of reactions.

A further objective of the present invention is to provide a method for dynamically controlling an interconnected fluidized bed, which can be applied and developed to the chemical looping process. By including various reactors, the efficiency of the chemical looping process can be optimized.

A still further objective of the present invention is to provide a method for dynamically controlling an interconnected fluidized bed, which provides a gate design on the orifices on the weir. Thereby, dynamic control can be achieved and not limited by the preset/default height and cross-sectional area of the orifices.

In order to achieve the objectives as described above, the present invention discloses a method for dynamically controlling an interconnected fluidized bed. The interconnected fluidized bed comprises a plurality of bed regions. A weir is used for separating the bed regions, respectively. Some of weirs include at least an orifice for passing a plurality of fluid-like particles. The method for dynamically controlling the circulation rate of solids of the fluid-like particles in the interconnected fluidized bed adopts at least one step selected from the group consisting of adjusting the height difference between the orifice and a bottom surface of the bed region, adjusting the cross-sectional area of the orifice, and adjusting the height of the weir.

DETAILED DESCRIPTION

In order to make the structure and characteristics as well as the effectiveness of the present invention be further understood and recognized, the detailed description of the present invention is provided as follows along with embodiments and accompanying figures.

Figure 1A:
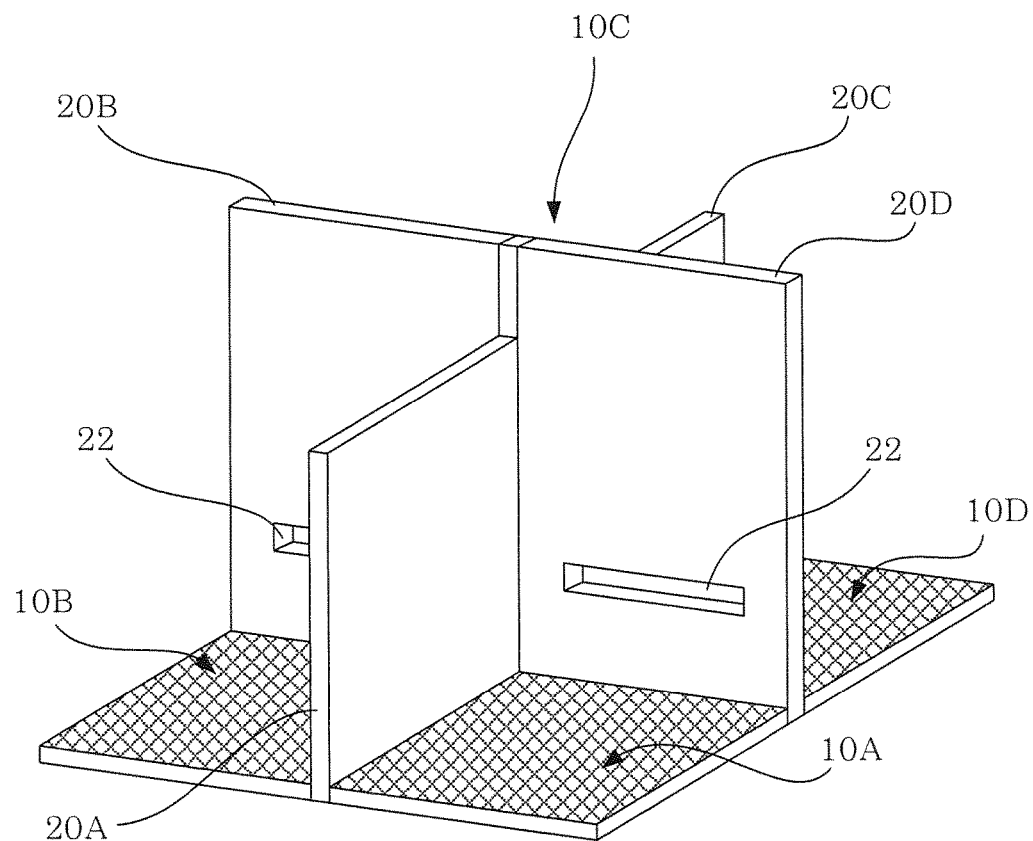
FIG. 1A shows a three-dimensional view of the inner structure of the interconnected fluidized bed formed by four bed regions according to a preferred embodiment of the present invention.
Figure 1B:
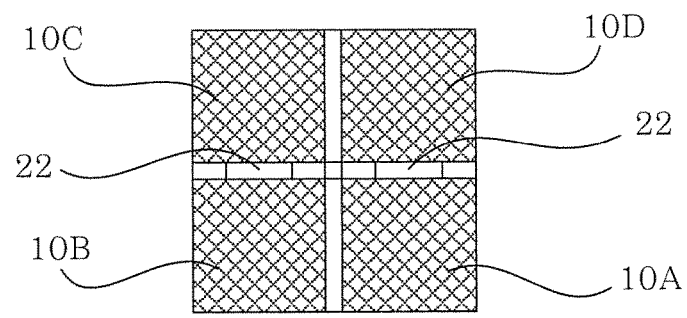
FIG. 1B shows a top view of the inner structure of the interconnected fluidized bed formed by four bed regions according to a preferred embodiment of the present invention.
Figure 1C:
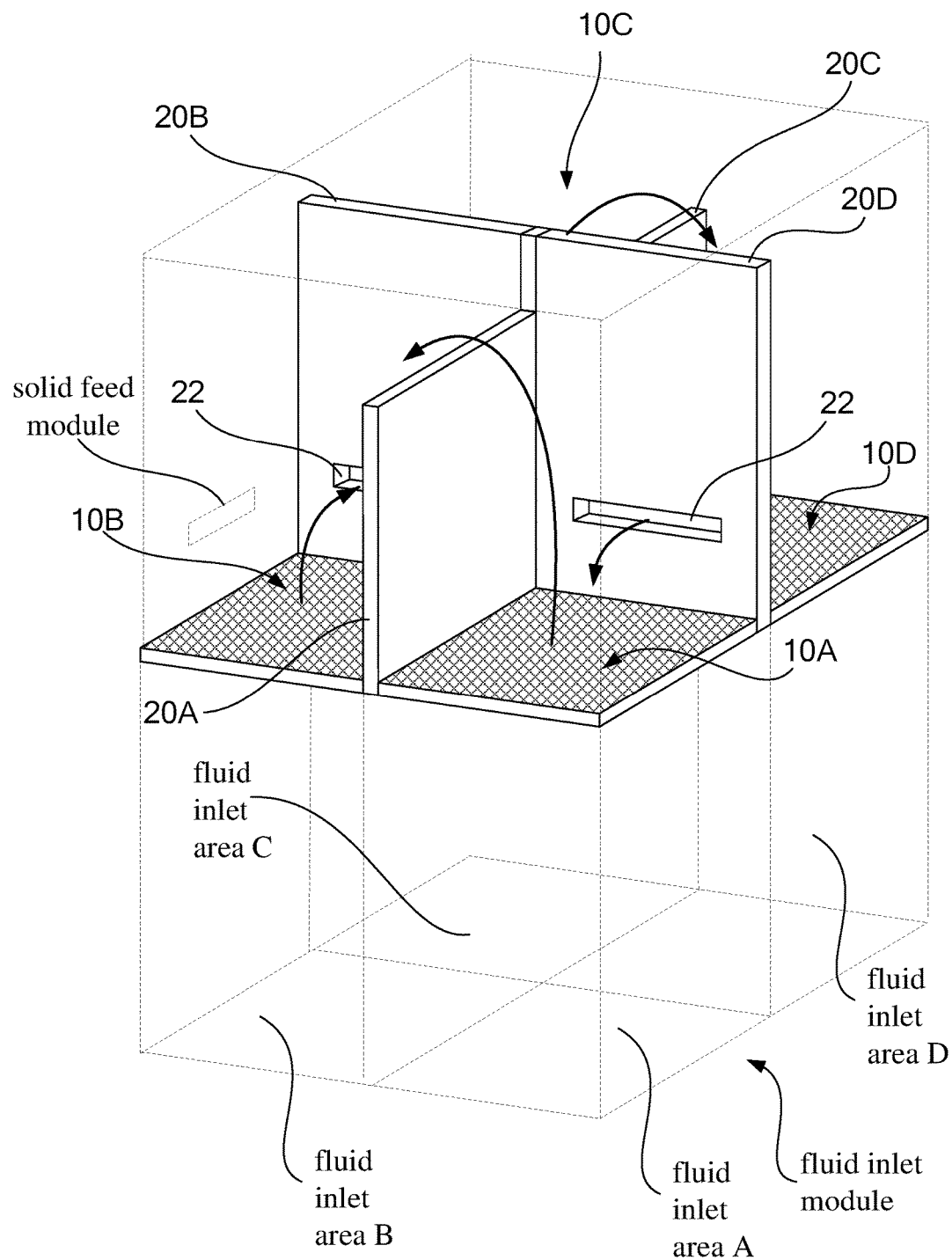
FIG. 1C shows a schematic diagram indicating the flow direction of the fluid-like particles in the interconnected fluidized bed formed by four bed regions according to a preferred embodiment of the present invention.

The method for dynamically controlling an interconnected fluidized bed according to the present invention is operated in an interconnected fluidized bed. Please refer to FIGS. 1A and 1B, which show an interconnected fluidized bed formed by four bed regions according to a preferred embodiment of the present invention. As shown in the figures, the interconnected fluidized bed comprises a plurality of bed regions 10A, 10B, 10C, 10D separated by weirs 20A, 20B, 20C, 20D. Wherein some weirs, such as the weirs 20B, 20D according to the present preferred embodiment, include at least an orifice 22 for passing a plurality of fluid-like particles. Said plurality of fluid-like particles preformed as a flow, which composed of a plurality of particles. The other weirs, such as the weirs 20A, 20C, have no orifice. The height of the weirs without orifice is lower than that of the weirs with one. Thereby, the fluid-like particles are allowed to surmount their top and reach the adjacent bed regions. The flow direction and path of the fluid-like particles are indicated in FIG. 1C.

The interconnected fluidized bed integrates the circulating fluidized beds and the solid transport pipes, that is, combining multiple bed regions of the fluidized bed into adjacent ones and separated by weirs only. Then, by transporting solids with different fluidized speeds among the bed regions, and thus accomplish various required reaction processes. Nonetheless, in a general interconnected fluidized bed, the control over the circulation rate of solids is quite limited. In particular, there is still no efficient method for adjusting and controlling the flowing process of the fluid-like particles in the bed regions. Accordingly, the present invention provides a method for dynamically controlling, based on the fact that the circulation rate of solids in an interconnected fluidized bed increases or decreases according to multiple variables. The formula is shown in Equation 1.

$$CSR(g/s) = C_D \times A_0 \times [2 \times \rho_s \times (1-\epsilon_{mf}) \times \Delta P]^{0.5} \quad \text{(Equation 1)}$$

where $C_D$ is the discharge coefficient; $A_0$ is the cross-sectional area of the orifice; $\rho_s$ is the density of solids; $\epsilon_{mf}$ is the bed voidage at the minimum fluidization velocity; and $\Delta P$ is the pressure drop through the orifice. Accordingly, the operational conditions of the interconnected fluidized bed is altered using various methods, according to the present invention for changing and adjusting the circulation rate of solids as described above to a required optimum rate.

The method for dynamically control according to the present invention is based on the concept of multiple unit control. In order to adjust multiple parameters, the following steps can be executed selectively: (1) adjusting the height difference between the orifice and the bottom surface of the bed region; (2) adjusting the cross-sectional area of the orifice; (3) adjusting the height of the weir; (4) adjusting the fluid entering rate of a fluid inlet module; (5) adjusting the solid quantity of the fluid-like particles in the interconnected fluidized bed; and (6) adjusting the solid type of the fluid-like particles in the interconnected fluidized bed. The present invention is not limited to adjusting a single parameter only. Instead, depending on the span of control, one or more parameters can be adjusted. Thereby, multiple steps can be executed for enhancing significantly the circulation rate of solids by making use the sum of the influences.

Figure 2:
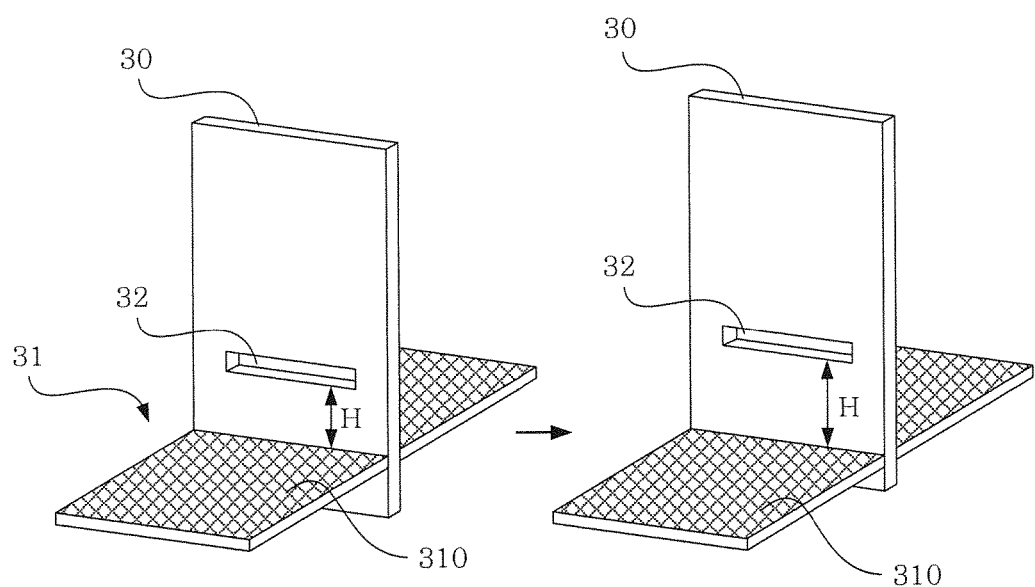
FIG. 2 shows a structural schematic diagram of adjusting the height of the orifice/slot on the weir according to a preferred embodiment of the present invention.

In the step (1) adjusting the height difference between the orifice and the bottom surface of the bed region, the weir can be connected with a lifting module that is not limited to any type. The lifting module can be disposed above the weir for towing the weir or under the weir for pushing it. Alternatively, the adjustment can be performed by an electromagnetic method for attracting or releasing the magnetic material on the weir. Please refer to FIG. 2. When the weir 30 changes its height with respect to the bottom surface 310 of the bed region 31 under the action of the lifting module (not shown in the figure), the height difference H between the orifice 32 and the bottom surface 310 of the bed region 31 changes accordingly. The principle of this step is that the fluid-like particles around the orifice is driven by the pressure or density difference between different bed regions, such as a dense bed and a lean bed. As the gas speed in the lean bed region increases, the bed height is increased and the density in the bed region is decreased. Thereby, the pressure drop through the orifice is increased, which drives the solids to circulate faster. Accordingly, by altering the height difference H as described above, the circulation rate of solids can be changed by using the pressure drop caused by height difference.

Figure 3A:
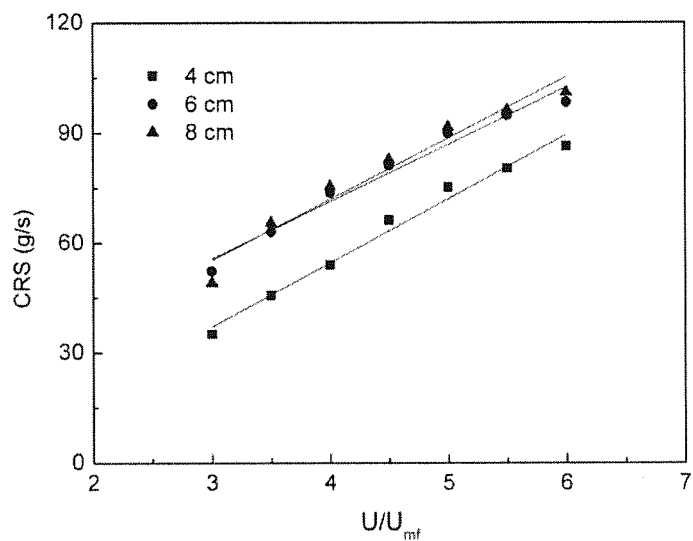
FIGS. 3A and 3B show test results of the influence by the height difference according to the present invention.
Figure 3B:
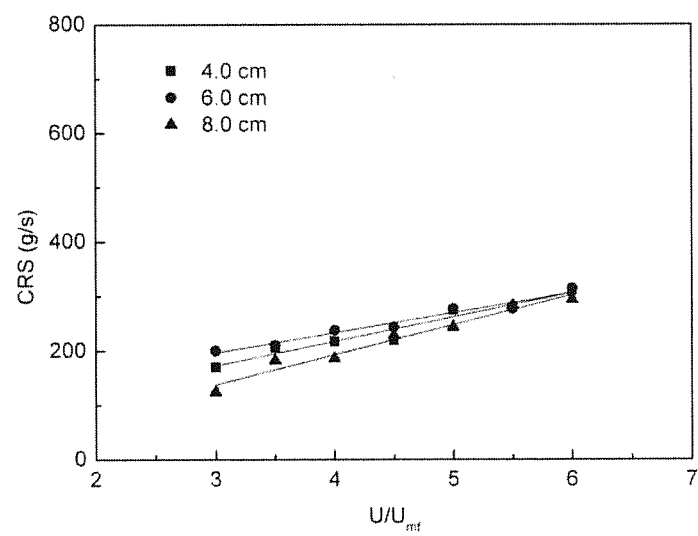

In a test example, the diameters of the orifices are 1.5 and 3.0 cm, respectively; the net weight of the fluid-like particles is 17.0 kilograms, and the gas velocity in the bed region $(U/U_{mf})$ is 4.5. The circulation rates of solids are compared in FIGS. 3A and 3B. As the height difference H are 4 and 6 cm, the circulation rates of solids are 66.28 and 81.28 grams/second, respectively. Obviously, when the height difference H is increased from 4 cm to 6 cm, the circulation rate of solids is increased. In addition, as the gas velocity in the bed region $(U/U_{mf})$ is increased, the circulation rate of solids is increased as well. Nonetheless, when the height difference is increased from 6 cm to 8 cm, the increase in the circulation rate of solids is small. It is thereby known that there is an upper limit in improvement by adopting only a single adjustment. For obtaining better improvements, other steps should be adopted concurrently.

Figure 4A:
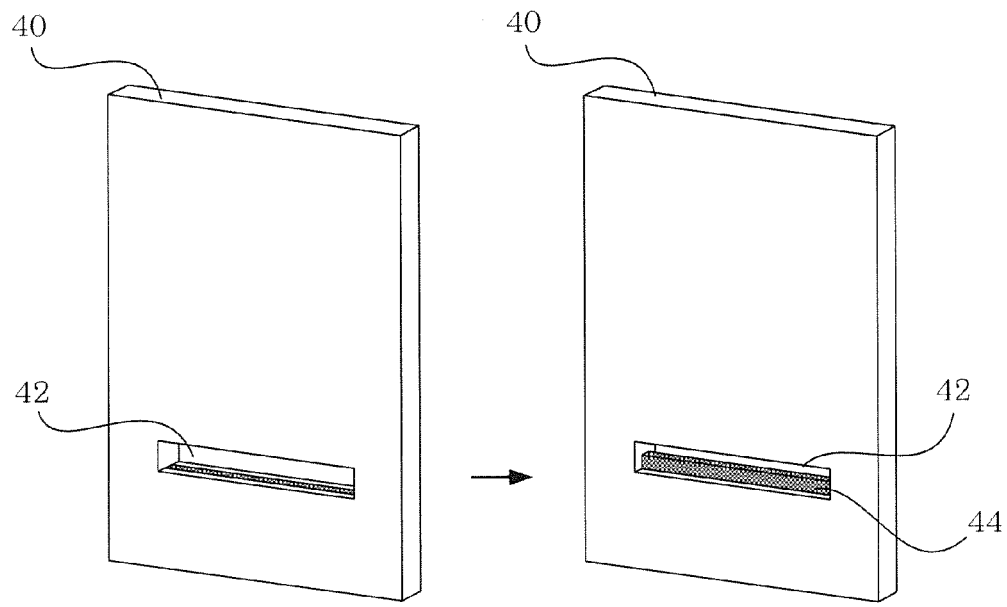
FIG. 4A shows a structural schematic diagram of using the gate according to a preferred embodiment of the present invention.
Figure 4B:
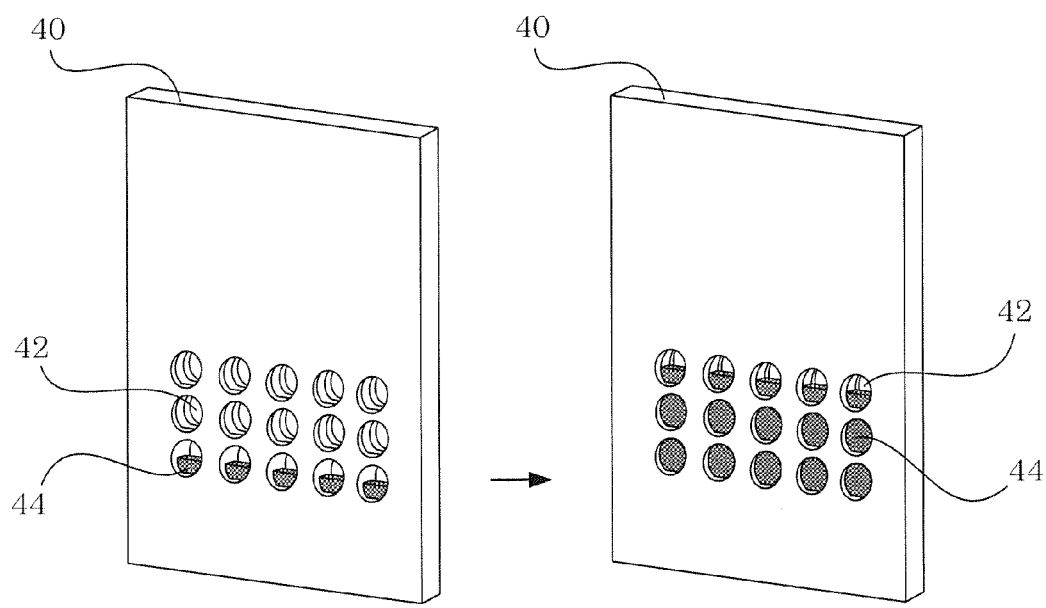
FIG. 4B shows a structural schematic diagram of using the gates according to another preferred embodiment of the present invention.

In the step (2) adjusting the cross-sectional area of the orifice, a gate can be disposed at the orifice. By gradually opening or closing the gate, the cross-sectional area of the orifice is changed linearly. FIG. 4A shows a design of the gate. An operable gate 44 is disposed at the orifice 42 of the weir 40 for changing the cross-sectional area of the orifice 42. Under the existence of the gate 44, the original size of the orifice 42 can be designed larger. Then, the gate 44 can be utilized to control flexibly the cross-sectional area of the orifice 42. Besides, the design of the gate 44 is not limited to vertical opening and closing. For example, in order to reduce changes in the height difference H during the opening or closing process of the gate, the gate can be designed to operate horizontally. FIG. 4B shows another form of gate for working with the orifice. The weir 40 includes a plurality of orifices 42. During the opening and closing process, the gates 44 can open or close part of the orifices 42 progressively. The distribution of the orifices 42 is not limited to uniform distribution; the quantity can be altered regularly and progressively according to the height of the weir 40. Thereby, as the gates 44 move vertically or horizontally at a constant rate, the cross-sectional area can be changed accordingly and progressively.

Figure 5A:
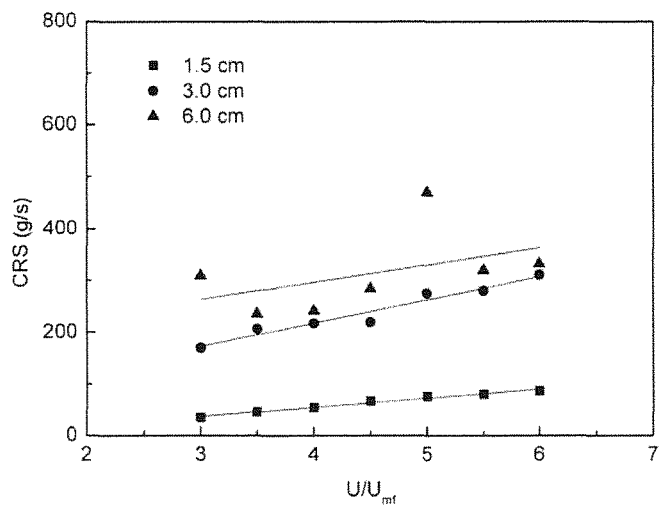
FIGS. 5A to 5C show test results of the influence by the cross-sectional area of the orifice according to the present invention.
Figure 5B:
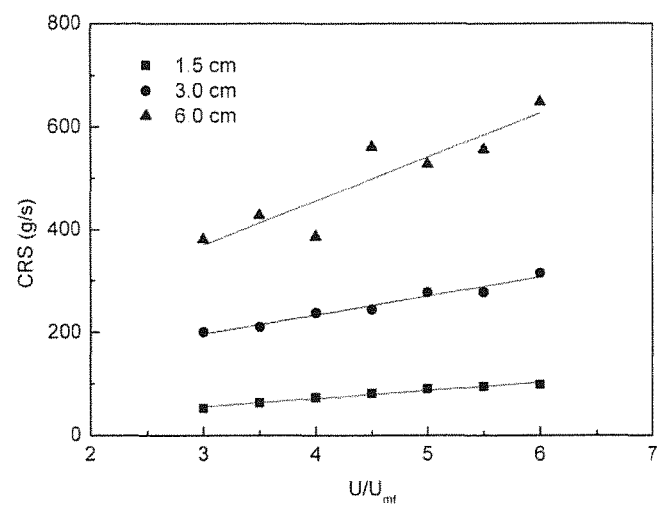
Figure 5C:
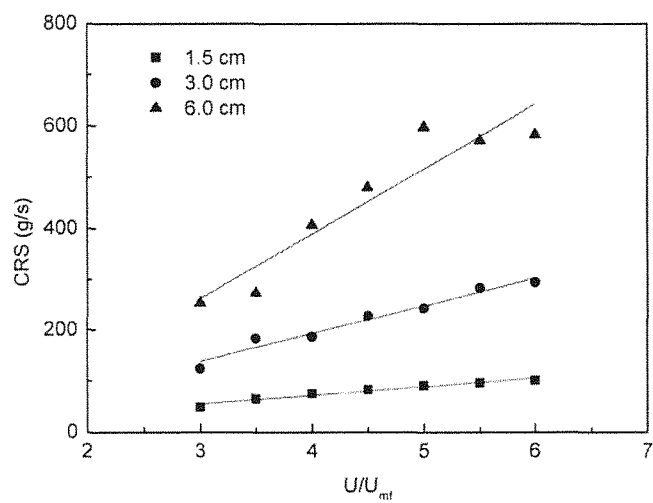

In a test example, the height differences are 4, 6, and 8.0 cm, respectively; the net weight of the fluid-like particles is 17.0 kilograms; the gas velocity in the bed region ($U/U_{mf}$) is 4.5. The circulation rates of solids are compared in FIGS. 5A to 5C. As the diameters of the circular orifices are 1.5, 3.0, and 6.0 cm, the circulation rates of solids are 66.28, 219.23, and 284.16 grams/second for H equal to 4 cm, 81.28, 243.93, and 560.32 grams/second for H equal to 6 cm, and 82.77, 228.00, and 479.74 grams/second for H equal to 8 cm, respectively. It is evident that when the cross-sectional area of the orifice is increased, the circulation rate of solids is increased.

In the step (3) adjusting the height of the weir, the lifting module described above can be used for adjusting the height for the weirs without orifice. The principle is that the weirs without orifice are provided so that the fluid-like particles can surmount their top and reach the adjacent bed regions. Thereby, as the height of the weirs is lowered, more fluid-like particles can naturally move among the bed regions.

In the step (4) adjusting the fluid entering rate of a fluid inlet module, the basic mechanism of the fluidized bed is applied. In other words, the fluid formed by gas or liquid enters the lower part of the bed regions having solids. If the gas velocity is lower than a certain threshold, the solids will not be fluidized and remain in the state of a fixed bed. If the gas velocity is increased to a value greater than the minimum fluidized velocity of the solid particles, the solid particles will be moved, become suspended, and thus flow with the fluid. According to the present invention, the fluid inlet module disposed at the lower part of the bed regions is used for increasing the gas velocity and enabling more fluids and solids move among the bed regions. According to FIGS. 3A, 3B, and 5A to 5B as described above, it is evident that when the gas velocity in the bed region ($U/U_{mf}$) is increased, the circulation rate of solids is increased accordingly.

In the steps (5) adjusting the solid quantity of the fluid-like particles in the interconnected fluidized bed and (6) adjusting the solid type of the fluid-like particles in the interconnected fluidized bed, the interconnected fluidized bed according to the present invention is connected with a feed module. This feed module can supply extra solids for circulation or extract a portion of solids from the interconnected fluidized bed. Then the number or composition of solids in the interconnected fluidized bed is changed, leading to change in the total weight or stack height of solids.

Figure 6A:
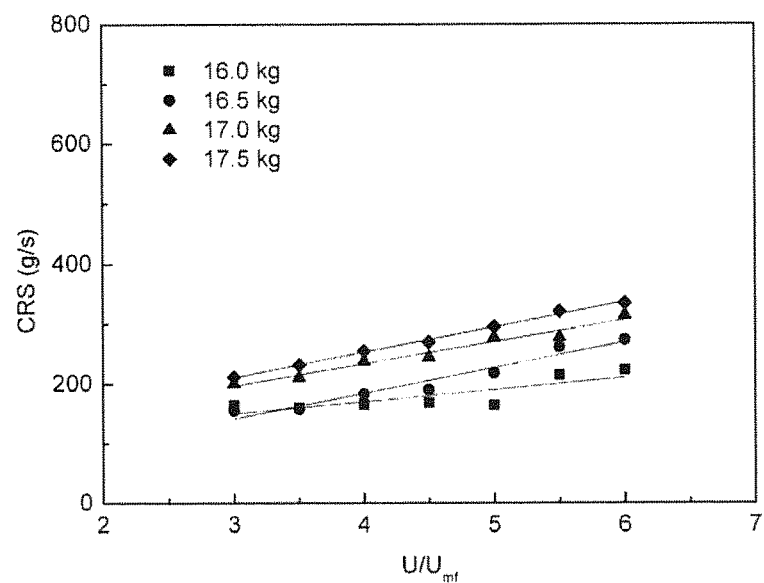
FIGS. 6A and 6B show test results of the influence of the weight of bed on the circulation rate of solids according to the present invention.
Figure 6B:
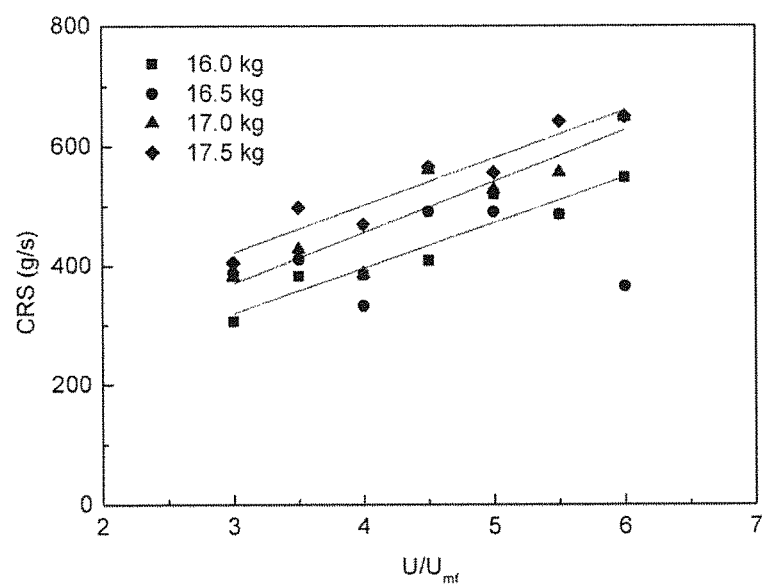

Please refer to FIGS. 6A and 6B for an example of using gas as the fluid. In the figures, the test results of bed weight on the circulation rate of solids are shown. The diameters of the orifices are 3 and 6 cm, respectively; the height difference H is 6 cm; the net weights of the fluid-like particles are 16, 16.5, 17.0, and 17.5 kilograms, respectively. The circulation rates of solids are compared in FIGS. 6A and 6B. According to the test results, it is evident that the circulation rate of solids is increased as the bed weight is increased. This is due mainly to the fact that as the bed weight is increased, the height of solids stacked on the bed regions is increased accordingly and combination of bubbles in the fluid is apparent. The diameters of the bubbles are increased when they reach the surface of the bed, which increases the burst intensity of the bubbles. The burst intensity is sufficient for more solids surmounting the weir, resulting in increase in the circulation rate of solids.

To sum up, the various steps disclosed in the present invention have their efficacy in improving rate. Nonetheless, considering the bottleneck for improving the circulation rate of solids for individual step, in order to achieving the maximum circulation rate of solids, a plurality of steps should be adopted for adjusting the parameters and achieving the overall efficacy. On the other hand, different solids require different reaction times in the bed regions. If the circulation rate of solids is too high, the residence time of solids in any bed regions is too short. Then it is possible that the solids are forced to exit before completion of reactions, leaving the purpose of chemical looping unfinished. Thereby, although the circulation rate of solids according to the present invention can be increased substantially, another significant meaning of the present invention is that the circulation rate of solids can be controlled flexibly and dynamically within the maximum circulation rate of solids. Hence, after the interconnected fluidized bed is started, the curve of circulation rate of solids can be converged at the fastest speed to the maximum circulation rate of solids and the load can be altered according to the requirement. Thereby, the present invention provides high practical values.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for dynamically controlling the circulation rate of solids in an interconnected fluidized bed, said interconnected fluidized bed comprising a plurality of bed regions respectively separated by a weir, a portion of said weirs having at least an orifice for passing a plurality of fluid-like particles, and for dynamically controlling the circulation rate of said fluid-like particles in said interconnected fluidized bed, said method comprising at least one step selected from the group consisting of:
   adjusting the height difference between said orifice and a bottom surface of said bed region;
   adjusting the cross-sectional area of said orifice; and
   adjusting the height of said weir.

2. The method for dynamically controlling the circulation rate of solids in the interconnected fluidized bed of claim 1, wherein a fluid inlet module is disposed at the lower part of said bed regions for transporting fluid upwards.

3. The method for dynamically controlling the circulation rate of solids in the interconnected fluidized bed of claim 2, and further comprising a step of adjusting the fluid entering rate of said fluid inlet module for dynamically controlling the circulation rate of solids of said fluid-like particles in said interconnected fluidized bed.

4. The method for dynamically controlling the circulation rate of solids in the interconnected fluidized bed of claim 1, wherein said interconnected fluidized bed is connected with at least a solid feed module.

5. The method for dynamically controlling the circulation rate of solids in the interconnected fluidized bed of claim 4, and further comprising a step of adjusting the solid quantity of said fluid-like particles in said interconnected fluidized bed using said feed module for dynamically controlling the circulation rate of solids of said fluid-like particles in said interconnected fluidized bed.

6. The method for dynamically controlling the circulation rate of solids in the interconnected fluidized bed of claim 4, and further comprising a step of adjusting the solid type of said fluid-like particles in said interconnected fluidized bed using said feed module for dynamically controlling the circulation rate of said fluid-like particles in said interconnected fluidized bed.

7. The method for dynamically controlling the circulation rate of solids in the interconnected fluidized bed of claim 1, wherein said weir connects with a lifting module in said step of adjusting the height difference between said orifice and said bottom surface of said bed region.

8. The method for dynamically controlling the circulation rate of solids in the interconnected fluidized bed of claim 1, wherein a gate is disposed and adjusted at said orifice in said step of adjusting the cross-sectional area of said orifice.

\* \* \* \* \*